Patented Sept. 5, 1939

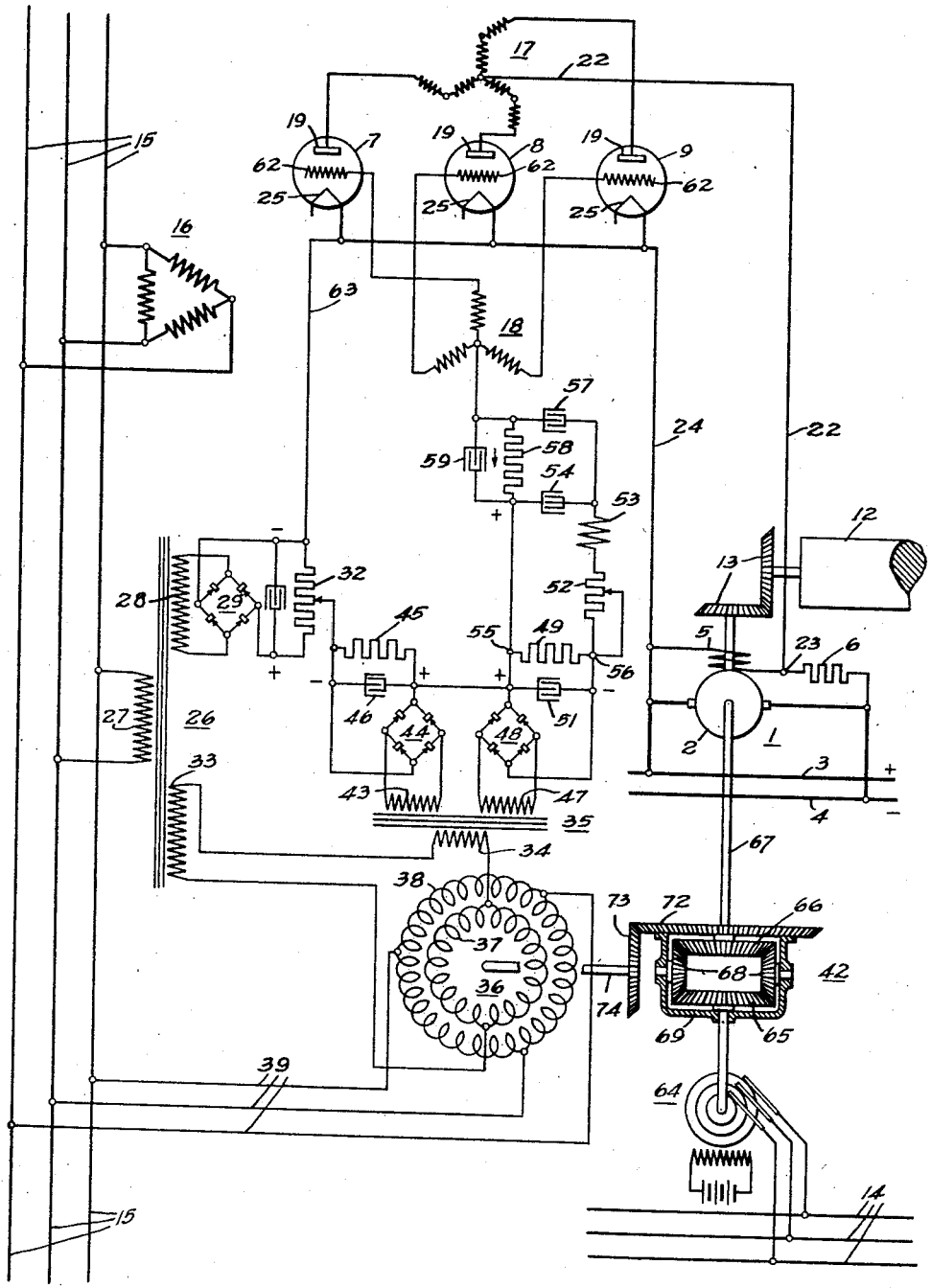

2,171,747

UNITED STATES PATENT OFFICE 2,171,747

SPEED REGULATOR

Finn H. Gulliksen, Wilkinsburg, Pa., assignor to Westinghouse Electric & Manufacturing Company, East Pittsburgh, Pa., a corporation of Pennsylvania Application March 30, 1937, Serial No. 133,910

11 Claims. (Cl. 172—293)

My invention relates to electronic speed regulators and is particularly adapted for governing the speed of a motor in response to variations from the speed of a master speed reference means.

In many industrial applications, it is desirable to govern the speed of one or more motors with reference to the speed of a master motor or speed reference means to maintain a fixed desired speed relation therebetween. Such an application, for example, is one in which material is required to pass through a plurality of machine sections or rolls that are driven by individual section driving motors that are required to run in synchronism, or at a definite speed relation with respect to one another.

An object of my invention is the provision of a speed regulator of the above indicated character in which the controlled portion is readily and automatically adjusted in response to variations in the speed of the regulated motor from its desired value.

Another object of my invention is the provision of anti-hunting means that acts promptly in response to a change in a regulated quantity.

Other objects and advantages of my invention will be apparent from the following description, reference being had to the accompanying drawing, in which the single figure illustrates circuits and apparatus comprising one preferred embodiment of the invention.

Referring to the drawing, a regulated motor 1 is provided having an armature winding 2 connected to a suitable source of direct current represented by conductors 3 and 4, and a field winding 5 that is connected to said source through a resistor 6 and is supplied with energy in part from said source and in part from rectifying tubes 7, 8 and 9 that are controlled in a manner to be described. The motor 1 may be one of a plurality of section driving motors, each driving a roll 12 through suitable gearing mechanism 13. The roll 12 may be representative of a plurality of rolls constituting one section of a machine, such as a paper making machine, that is desired to drive at a certain speed with respect to a master speed reference means, such as the alternating-current source 14. Other section driving motors may be similarly controlled with respect to the frequency of alternating-current in the conductors 14 in a manner similar to motor 1.

A suitable alternating-current source represented by conductors 15 is provided for supplying three-phase energy to the transformer primary windings 16, shown connected in delta and inductively coupled to the transformer secondary windings 17 and 18. The windings 17 constituting an anode transformer are connected in double Y relationship, the outer terminals being connected to the anodes 19 of the respective rectifying tubes 7, 8 and 9, and the neutral point being connected by conductor 22 leading to a junction point 23 between the resistor 6 and the motor field winding 5, the other side of the field winding being connected by conductor 24 to the cathodes 25 of the tubes 7, 8 and 9. The windings 18 are Y connected to provide an alternating current ripple in the grid circuit at approximately 90° displacement from the anode voltage.

A control transformer 26 is provided having a primary winding 27 that is connected to be supplied with energy from one phase of the alternating-current conductors 15, and a secondary winding 28 that is connected to a full-wave rectifier 29 for supplying a unidirectional voltage to a resistor 32 that is proportional to the alternating-current voltage supplied to the winding 27. The transformer 26 is also provided with a secondary winding 33 that is connected in circuit to supply a constant component of voltage to the primary winding 34 of a regulating transformer 35. A variable component of voltage is introduced into the primary circuit of the regulating transformer through a phase shifter 36 having secondary winding 37 connected in said circuit and a primary winding 38 that is connected by conductors 39 to the alternating-current three-phase source 15. The inductively related windings 37 and 38 of the phase shifter 36 are relatively movable and are actuated by a differential mechanism 42 in a manner to be later explained to vary the phase angle of the component introduced thereby. The regulating transformer 35 is provided with a secondary winding 43 that supplies energy to a full-wave rectifier 44 that supplies a unidirectional voltage across a resistor 45 that is a measure of the alternating-current voltage supplied to the winding 34. A filter circuit represented by the condenser 46 is provided for eliminating ripples in the unidirectional potential. The regulating transformer 35 is also provided with a secondary winding 47 that supplies energy to the full-wave rectifier 48 for supplying a unidirectional potential across the resistor 49 that is also a measure of the potential supplied to the primary winding 34 of the regulating transformer 35. A filter circuit represented by the condenser 51 is provided to eliminate the unidirectional wave ripples.

The voltage supplied to the resistor 49 is applied to the anti-hunting network, consisting of a resistor 52, a reactor 53, and a condenser 54, connected in series between the terminals 55 and 56 of resistor 49, and a condenser 57 and resistor 58 that are connected in series circuit relation with each other and in parallel with the condenser 54. A condenser 59 may be provided in parallel with the resistor 58 to effect a smoother or more gradual change in the potential across resistor 58.

The rectifier tubes 7, 8 and 9 are each provided with control grids 62, the potentials of which are controlled by a circuit extending from the tube cathodes 25 through conductor 63, the resistors 32, 45 and 58 in series, then through the respective separate branches of the Y connected transformer windings 18 to the respective grids 62 of the several tubes 7, 8 and 9. In this grid circuit, it will be noted that the voltage component supplied by the resistor 32 is substantially constant, since it is determined by the voltage of the standard source 15. The potential across the resistor 45 is a variable depending upon the voltage impressed upon the primary winding 34 of the regulating transformer 35. The voltage across the resistor 58 is zero so long as the voltage impressed on the regulating transformer 35 is constant, and the voltage component from the windings of the grid transformer 18 introduces an alternating-voltage wave for firing the tubes that is displaced substantially 90° from the anode voltage supplied by the anode transformer winding 17.

When voltage is supplied to the regulating transformer 35 at a constant potential, the corresponding unidirectional potential across the resistor 49 supplied by the full-wave rectifier 48 causes a current to flow to charge the condenser 54 to a predetermined value depending upon the potential across the resistor 49. The potential across the condenser 54 is impressed across the condenser 57 and resistor 58 in series, causing current to flow to charge the condenser 57 to a predetermined value. During the flow of current to the condenser 57, upon an increase in potential across the condenser 54, current flows in one direction through the resistor 58 to make one end thereof more positive than the other, and thus introduce a component of voltage into the grid control circuit the value of which is determined by the rate of change in the voltage across the resistor 49. Likewise a decrease in the potential across the resistor 49 and across the condenser 54 after the condensers 54 and 57 have been charged, causes current to flow from the condenser 57 through the resistor 58 in the opposite direction so that a potential drop exists across the resistor 58 in a direction opposite to that existing during the charging of the condensers 57 and 54 which introduces a component of voltage into the grid control circuit of opposite polarity to that introduced when the condensers are being charged. So long as the charge on the condensers 54 and 57 remains constant, substantially no current flows through the resistor 58 and no voltage component is introduced at this point in the grid control circuit.

A synchronous motor 64 is provided that runs in synchronism with the frequency of the source 14 which acts as a master speed reference for the motor 1. The motor 64 is connected to a sun gear 65 of the mechanical differential device 42, the opposite sun gear 66 being connected by a shaft 67 to run in synchronism with the regulated motor 1. The gears 65 and 66 mesh with planetary gears 68 mounted on a rotatable casing 69 of the differential device that is connected through gears 72 and 73 and shaft 74 to the phase shifting device 36. When the motor 1 is started and brought up to speed, the differential device 42 and the phase shifter 36 are connected in the manner shown. So long as the speed of the motor 1 is maintained at the desired relationship with respect to the speed of the reference motor 64, the sun gears 65 and 66 revolve in opposite directions at the same speed, so that the planetary gears 68 and the casing 69 do not revolve about the axis of the shaft 67, thereby maintaining the windings 36 and 37 of the phase changing device 38 in a fixed position to supply a constant alternating-current voltage component to the winding 34 of the regulating transformer 35.

A unidirectional grid control voltage of constant value consisting of the voltage components across the resistors 32 and 45 is thereby impressed between the cathodes 25 and the grids 62 of the rectifying tubes 7, 8 and 9, upon which is superimposed the alternating-current wave of the grid transformer windings 18 for firing the tubes 7, 8 and 9 for some predetermined proportion of each positive half cycle to supply a unidirectional current from the rectifier tubes 7, 8 and 9 through the field winding 5 of the motor 1. So long as the speed of the motor 1 is maintained at its desired value, the grid potential impressed upon the tubes 7, 8 and 9 and the current output of these tubes will remain constant. If the speed of the motor 1 drops below the speed of the reference motor 64, the speed of the sun gear 66 correspondingly decreases with respect to the speed of the sun gear 65, causing the planetary gears 68 to revolve about the axis of the shaft 67 and actuate the gears 72 and 73 to shift the relative position of the windings 36 and 37 of the phase shifter 36 to decrease the voltage impressed on the regulating transformer 35, thus correspondingly decreasing the unidirectional voltages across the resistors 45 and 49. The reduction in the voltage drop across the resistor 45 causes the potential impressed upon the grids 62 of the rectifying tubes 7, 8 and 9 to become less positive to thereby decrease the current flowing through the several tubes and the winding 5 of the motor 1 to cause the speed of the motor 1 to increase. The decrease in potential across the resistor 49 causes the potential across the condenser 54 and the condenser 57 to likewise decrease, thus causing a current to flow from the condenser 57 through the stabilizing resistor 58 in a direction to make the upper end of the resistor 58 more negative than the lower end, and thus further reducing the potential of the grids 62 of the several tubes 7, 8 and 9 and causing a more sudden drop in the current through the field winding 5 than would otherwise occur. The voltage component introduced into the grid circuit across the resistor 58 is of short duration, since the voltage drop across this resistor becomes zero when the potential across the condensers 54 and 57 again become equal to the voltage across the resistor 49, and the discharging current ceases to flow from the condenser. The introduction of the voltage component in the grid circuit through resistor 58 causes the correction in the motor speed to be more rapid than it otherwise would be, thus preventing overtravel in the corrective action due to a delayed response, during which time the motor 1 would be gradually moving further out of phase with respect to the master motor 64.

If the motor 1 increases its speed above the desired value, the sun gear 66 will be operated at a higher speed than the sun gear 65 associated with the master motor 64, thus causing the gears 72 and 73 to move in the opposite direction, to shift the relative positions of the windings 37 and 38 of the phase shifter in the opposite direction and increase the voltage impressed on the regulating transformer 35, and consequently the unidirectional voltage components across the resistors 45 and 49. The increase in the voltage component across the resistor 45 causes the grids 62 of the rectifying tubes 7, 8 and 9 to become more positive with respect to the anode voltages, thus increasing the current output of the tubes through the field winding 5 of the motor 1 and causing the speed of the motor 1 to decrease. The increase in voltage across the resistor 49 causes a charging current to flow to increase the charge on the condenser 54, and on the condenser 57, which current flow causes a potential to be developed across the resistor 58 in a direction to make the upper end of the resistor more positive than the lower end, to thus further increase the positive bias of the grid 62 and correspondingly increase the current output from the rectifier tubes 7, 8 and 9 through the motor field winding 5 to effect a more rapid correction in the motor speed. The earlier introduction of a substantial corrective force to bring the motor to its desired speed early in the cycle of its departure from the desired speed stabilizes the motor speed characteristic thus preventing it from swinging as far out of phase from the master motor 64 as it otherwise would.

Many modifications in the circuits and apparatus illustrated may be made without departing from the spirit of my invention, and I do not wish to be limited otherwise than by the scope of the appended claims.

I claim as my invention:

1. In a speed regulator system, in combination, a direct-current motor to be regulated having an armature winding and a field winding, a direct-current source of power for supplying energy to said direct-current motor, means for controlling the excitation of the motor field winding comprising an alternating-current source of electrical energy and rectifier means, means for developing an alternating control voltage for governing said rectifier means, means for varying said control voltage in accordance with variations in the speed of the regulated motor from its desired value, and anti-hunting means comprising a rectifier supplied with energy at a voltage responsive to variations in the alternating control voltage and a network connected to the output side of the rectifier for developing a temporary voltage component corresponding to the rate of change in said alternating control voltage.

2. In a regulator system, an alternating-current power circuit, a direct-current motor having a field winding, means for regulating the speed of said motor comprising grid controlled rectifier means for supplying a unidirectional current to said field winding, means for controlling the current output of said rectifier means in response to variations in the speed of said motor from a desired value, and means responsive to the initiation of a change in the current output of said rectifier means for effecting a further sudden change in current output of said rectifier in the same direction and of short duration.

3. In a regulator system, an alternating-current power circuit, a direct-current motor having a field winding, means for regulating the speed of said motor comprising grid controlled rectifier means for supplying a unidirectional current to said field winding, means for producing a corrective grid control voltage component for controlling said rectifier means that varies in response to variations in the speed of the motor from its desired value, and means for temporarily introducing a further corrective voltage component into said grid circuit that aids the last-named grid control voltage component and that is a measure of the rate of variations in said grid control voltage.

4. In a regulator system, an alternating-current power circuit, a direct-current motor having a field winding, means for regulating the speed of said motor comprising grid controlled rectifier means for supplying a unidirectional current to said field winding, means for controlling the current output of said rectifier means in response to variations in the speed of said motor from a desired value comprising a grid control circuit and means for supplying unipotential current from said alternating-current source to said grid control circuit, means for varying the grid potential comprising a master speed reference means and a phase shifter connected to said alternating current source and actuated in response to the differential speed relation between said speed reference means and the regulated motor, and means responsive to a variation in the voltage impressed on said grid control circuit for effecting a further sudden change of short duration in the grid potential in the same direction.

5. In a regulator system, an alternating-current power circuit, a direct-current motor having a field winding, means for regulating the speed of said motor comprising grid controlled rectifier means for supplying a unidirectional current to said field winding, means for controlling the current output of said rectifier means in response to variations in the speed of said motor from a desired value comprising a grid control circuit, a plurality of full-wave rectifying means for developing two unipotential voltage components that are each a measure of the speed of the regulated motor, means for continuously introducing one of said voltage components into said grid control circuit, and means comprising a network for introducing a temporary voltage surge into said grid circuit upon a variation in the other voltage component in a direction to aid the correction in the motor speed.

6. In a regulator system, an alternating-current power circuit, a direct-current motor having a field winding, means for regulating the speed of said motor comprising grid controlled rectifier means for supplying a unidirectional current to said field winding, means for controlling the current output of said rectifier means in response to variations in the speed of said motor from a desired value comprising a grid control circuit, a regulating transformer supplied with energy from said alternating-current source, a phase shifter in circuit with the primary winding of said regulating transformer, and means for actuating said phase shifter in response to variations in the speed of the regulated motor from its desired value, a plurality of rectifying means supplied with energy from said regulating transformer for producing unidirectional voltage components responsive to the voltage supplied to said regulating transformer, means for continuously introducing one of said voltage components into said grid control circuit, and means comprising a network for introducing a temporary voltage surge into said grid circuit upon a variation in the other voltage component in a direction to aid the correction in the motor speed.

7. In a speed regulator system, in combination, a direct-current motor to be regulated having a field winding, means for supplying energy to said field winding comprising an alternating-current source of electrical energy and grid-controlled rectifier means, a grid control circuit for said rectifier means, means including a source of alternating control voltage and a plurality of rectifier means for introducing unidirectional voltage components into said grid control circuit, one of said unidirectional voltage components varying with variations in said alternating control voltage in a direction to effect a correction in the motor speed, another of said unidirectional voltage components varying with the direction and degree of voltage change in the alternating control voltage, also in a direction to effect a correction in the motor speed, and means for varying said alternating control voltage in accordance with variations in the speed of the regulated motor from its desired value.

8. In a speed regulator system, in combination, a direct-current motor to be regulated having a field winding, means for supplying energy to said field winding comprising an alternating-current source of electrical energy and grid-controlled rectifier means, means for developing a grid control voltage for governing said rectifier means comprising a source of alternating control voltage and a plurality of rectifier means for developing unidirectional voltages that vary with variations in said alternating control voltage, one of said rectifier means being connected to introduce its developed unidirectional voltage into said grid control circuit, another of said rectifier means being connected to an anti-hunting network for introducing a potential into said grid control circuit that varies in amount and direction with variations in said alternating control voltage, and means for varying said alternating control voltage in accordance with variations in the speed of the regulated motor from its desired value.

9. In a regulator system, an alternating-current power circuit, a direct-current motor having a field winding, means for regulating the speed of said motor comprising grid-controlled rectifier means for supplying a unidirectional current to said field winding, means for controlling the current output of said rectifier means in response to variations of the speed of said motor from a desired value including a grid control circuit and means for introducing unidirectional voltage components into said grid-controlled circuit from said alternating-current source comprising a phase shifter for developing a variable control alternating voltage and a pair of rectifier means, one of said rectifier means being connected to introduce its developed unidirectional voltage directly into said grid control circuit, and the other of said rectifier means being connected to an anti-hunting network to introduce a potential into said grid control circuit that varies in amount and direction with variations in said control alternating voltage, and means for actuating said phase shifter comprising a speed reference means and differential mechanism responsive to the differential speeds of said regulated motor and said speed reference means.

10. In a regulator system, an alternating-current power circuit, a direct-current motor having a field winding and an armature winding, a direct-current source of power for supplying energy to said direct-current motor, means for governing the excitation of said motor to regulate the motor speed comprising a grid controlled rectifier means, means for controlling the current output of said rectifier means in response to variations in the speed of said motor from a desired value comprising a grid control circuit, a plurality of full-wave rectifying means for developing unipotential voltage components that are each a measure of the speed of the regulated motor, means for continuously introducing one of said voltage components into said grid control circuit, and means comprising a network for introducing a temporary voltage surge into said grid circuit upon a variation in another of said voltage components in a direction to aid the correction in the motor speed.

11. In a regulator system, an alternating-current power circuit, a direct-current motor having a field winding and an armature winding, a direct-current source of power for supplying energy to said direct-current motor, means for governing the excitation of said motor to regulate the motor speed comprising a grid controlled rectifier means, means for controlling the current output of said rectifier means in response to variations in the speed of said motor from a desired value comprising a grid control circuit, a regulating transformer supplied with energy from said alternating-current source, a phase shifter in circuit with the primary winding of said regulating transformer, and means for actuating said phase shifter in response to variations in the speed of the regulated motor from its desired value, a plurality of rectifying means supplied with energy from said regulating transformer for producing unidirectional voltage components responsive to the voltage supplied to said regulating transformer, means for continuously introducing one of said voltage components into said grid control circuit, and means comprising a network for introducing a temporary voltage surge into said grid circuit upon a variation in the other voltage component in a direction to aid the correction in the motor speed.

FINN H. GULLIKSEN.